S. L. PRICE.
DEVICE FOR STARTING INTERNAL COMBUSTION ENGINES.
APPLICATION FILED DEC. 15, 1920.
1,379,361.
Patented May 24, 1921.
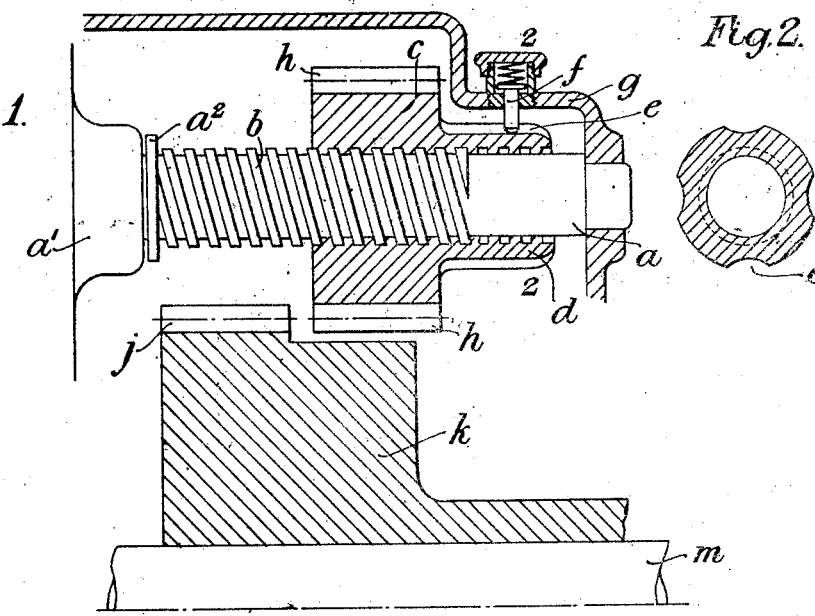
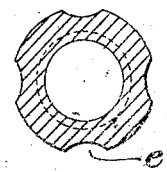
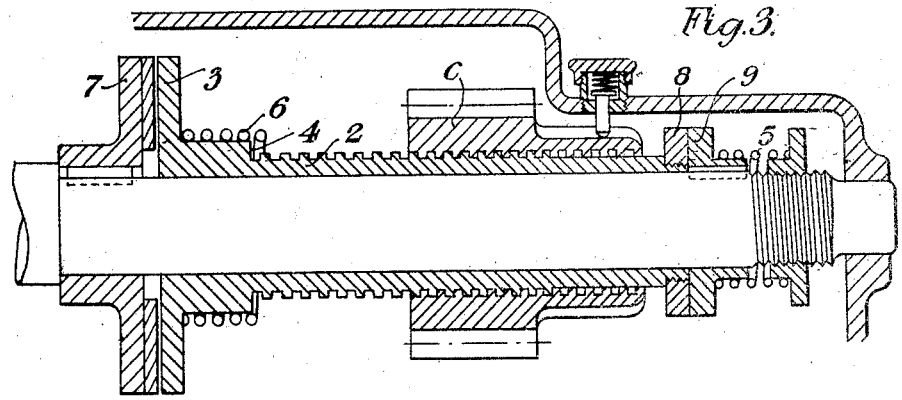
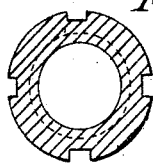
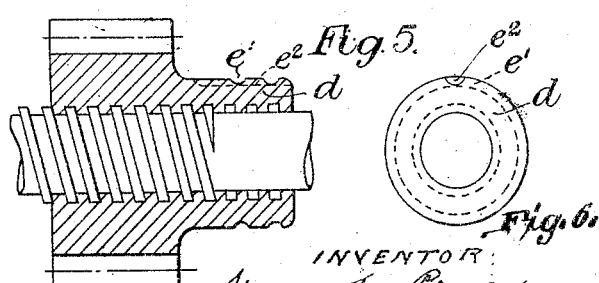
INVENTOR
Sidney L. Price
BY Wm Wallace White
ATTY

UNITED STATES PATENT OFFICE.

SIDNEY LEOPOLD PRICE, OF LONDON, ENGLAND.

DEVICE FOR STARTING INTERNAL-COMBUSTION ENGINES.

1,379,361.  Specification of Letters Patent.  Patented May 24, 1921.

Application filed December 15, 1920. Serial No. 430,986.

*To all whom it may concern:*

Be it known that I, SIDNEY LEOPOLD PRICE, of 62 Eagle street, Holborn, London, W. C. 2, England, a subject of the King of Great Britain and Ireland, have invented certain new and useful Improvements in or Relating to Devices for Starting Internal-Combustion Engines, of which the following is a specification.

This invention relates to devices for starting internal combustion engines of the type in which an electrically driven motor provided with a threaded spindle working in a pinion provided with an internal thread causes the pinion to travel on the spindle and mesh with a gear wheel on the engine shaft, and start the engine, but which on starting, causes the pinion to travel back on the spindle and put the starting motor out of engagement with the engine, means being provided to prevent the pinion from rotating on the spindle on the inward movement.

The object of this invention is to provide an improved device of this type.

In a starting device made in accordance with this invention the pinion on the motor spindle or sleeve thereon is held from turning for the purpose of engaging the gears by a stud or plunger pressed into engagement with the pinion by a spring and in some cases I provide grooves on the pinion for the stud to engage with or without one or more clutches on the motor spindle so that the engine may be started gradually in a manner well known in starting devices and, for that purpose the threaded spindle may take the form of a sleeve with a spring pressed clutch or clutches between the spindle and sleeve, the clutch yielding sufficiently if necessary to insure gradual starting.

The pinion may be provided with an extension having an annular groove or grooves.

Referring to the drawings filed herewith:—

Figure 1 is a sectional elevation of one form of device made in accordance with this invention;

Fig. 2 is a transverse section on line 2, 2, Fig. 1;

Fig. 3 is a sectional elevation of a modified construction;

Fig. 4 is a transverse section similar to Fig. 2, but showing a different form of the grooves from that shown in Fig. 2;

Fig. 5 is a fragmentary longitudinal sectional view illustrating the annular grooves on the extension of the pinion; and, Fig. 6 is an end view of the extension shown in Fig. 5.

The spindle $a$ of the starting motor $a'$ is provided with a quick thread $b$. On the spindle $a$ is a pinion $c$ having an inclined thread and an extension $d$ provided with grooves $e$ adapted to engage a spring pressed stud $f$ on the casing $g$.

The pinion $c$ is provided with teeth $h$ adapted to engage a spur wheel $j$ on the fly wheel $k$ secured to the shaft $m$ of the engine to be started. The spindle $a$ is provided with a stop $a^2$.

In use when it is desired to start the engine the motor $a'$ is set in motion causing the pinion to travel along the spindle $a$ until the sleeve $d$ of the pinion $c$ is out of engagement with the stud $f$ and the pinion is in engagement with the spur wheel $j$. The pinion $c$ coming against the stop $a^2$ rotates with the spindle $a$ and starts the engine.

In the modified construction shown in Fig. 3 the threaded spindle is in the form of a sleeve 2 on the spindle of the motor. The sleeve 2 is provided with a stop 4 and a spring 6. The sleeve 2 is further provided with one member 3 of a clutch device adapted to engage the other member 7 of the clutch on the spindle. A spring 5 keeps the members in contact. The sleeve 2 is also provided with a clutch member 8 which engages with another clutch member 9 keyed to the spindle and capable of sliding thereon. The spring 5 presses on the clutch member 9, the pressure being transmitted to the other clutch members. In use the operation is as described with reference to Figs. 1 and 2, but on the pinion $c$ reaching the stop 4 after compressing the spring 6, the clutch parts slip sufficiently on one another to permit the engine to be started without shock, it being understood that the tension of the springs 5 is sufficient to prevent the slipping of the clutch members under normal operation. In the case of a back fire the clutches yield and so prevent damage to the pinion.

In the modification shown in Fig. 5, the extension $d$ of the pinion $c$ is provided with annular grooves $e'$ and a longitudinal groove $e^2$ to prevent the rebound of the pinion after disengagement of the gears.

What I claim and desire to secure by Letters Patent is:—

1. A starting device for internal combustion engines, comprising, in combination, a threaded spindle, an internally threaded pinion in engagement with said spindle and provided with an exteriorly grooved axial extension, and a spring-pressed plunger in position to engage the grooves of said extension for preventing rotation of the pinion with said spindle.

2. A starting device for internal combustion engines, comprising, in combination, a rotatable spindle, an exteriorly threaded sleeve mounted for rotation on said spindle, coöperating clutch members carried by the spindle and sleeve for rotating said sleeve with said spindle, said clutch members being maintained in engagement with each other under spring tension, an interiorly threaded pinion in engagement with said sleeve, said pinion being provided with an exteriorly grooved axial extension, and a spring-pressed plunger in position to engage the grooves of said extension.

3. A starting device as set forth in claim 2, the grooves of said extension extending some axially and some circumferentially thereof.

In testimony whereof I have signed my name to this specification.

SIDNEY LEOPOLD PRICE.